(12) United States Patent
Huang

(10) Patent No.: US 8,151,134 B2
(45) Date of Patent: Apr. 3, 2012

(54) SPI DEVICES AND METHOD FOR TRANSFERRING DATA BETWEEN THE SPI DEVICES

(75) Inventor: Cheng-Wen Huang, Taipei Hsien (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 202 days.

(21) Appl. No.: 12/731,149

(22) Filed: Mar. 25, 2010

(65) Prior Publication Data
US 2011/0072297 A1 Mar. 24, 2011

(30) Foreign Application Priority Data
Sep. 22, 2009 (CN) .................. 2009 1 0307464

(51) Int. Cl.
*G06F 1/08* (2006.01)
(52) U.S. Cl. ......................... 713/600; 710/60

(58) Field of Classification Search .................. 710/60; 713/500, 600
See application file for complete search history.

(56) References Cited

U.S. PATENT DOCUMENTS
6,687,769 B2 * 2/2004 Cheung ................. 710/52
7,606,952 B2 * 10/2009 Chen ..................... 710/58
2011/0060856 A1 * 3/2011 Huang et al. ............ 710/110
* cited by examiner

*Primary Examiner* — Albert Wang
(74) *Attorney, Agent, or Firm* — Altis Law Group, Inc.

(57) ABSTRACT

A method for transferring data between a serial peripheral interface (SPI) master device and an SPI slave device generates a first clock signal for the SPI master device and a second clock signal for the SPI slave device. Clock frequency of the first clock signal and the second clock signal is twice than a serial clock signal between the SPI master device and the SPI slave device. Data are transferred with double data rate or single data rate based on the first clock signal and the second clock signal.

16 Claims, 10 Drawing Sheets

SPI DEVICES AND METHOD FOR TRANSFERRING DATA BETWEEN THE SPI DEVICES

BACKGROUND

1. Technical Field

Embodiments of the present disclosure relate to serial data transfer technology, and particularly to serial peripheral interface (SPI) devices and method for transferring data between the SPI devices.

2. Description of Related Art

Many current SPI devices transfer a bit per clock cycle of a serial clock signal. However, clock frequency of the serial clock signal can be restricted for certain reasons, such as for signal integrity concerns. For example, the maximum clock frequency of the serial clock signal may be limited to 32 MHz. As a result, the data transfer rate of the SPI devices is limited.

DETAILED DESCRIPTION

Figure 1:
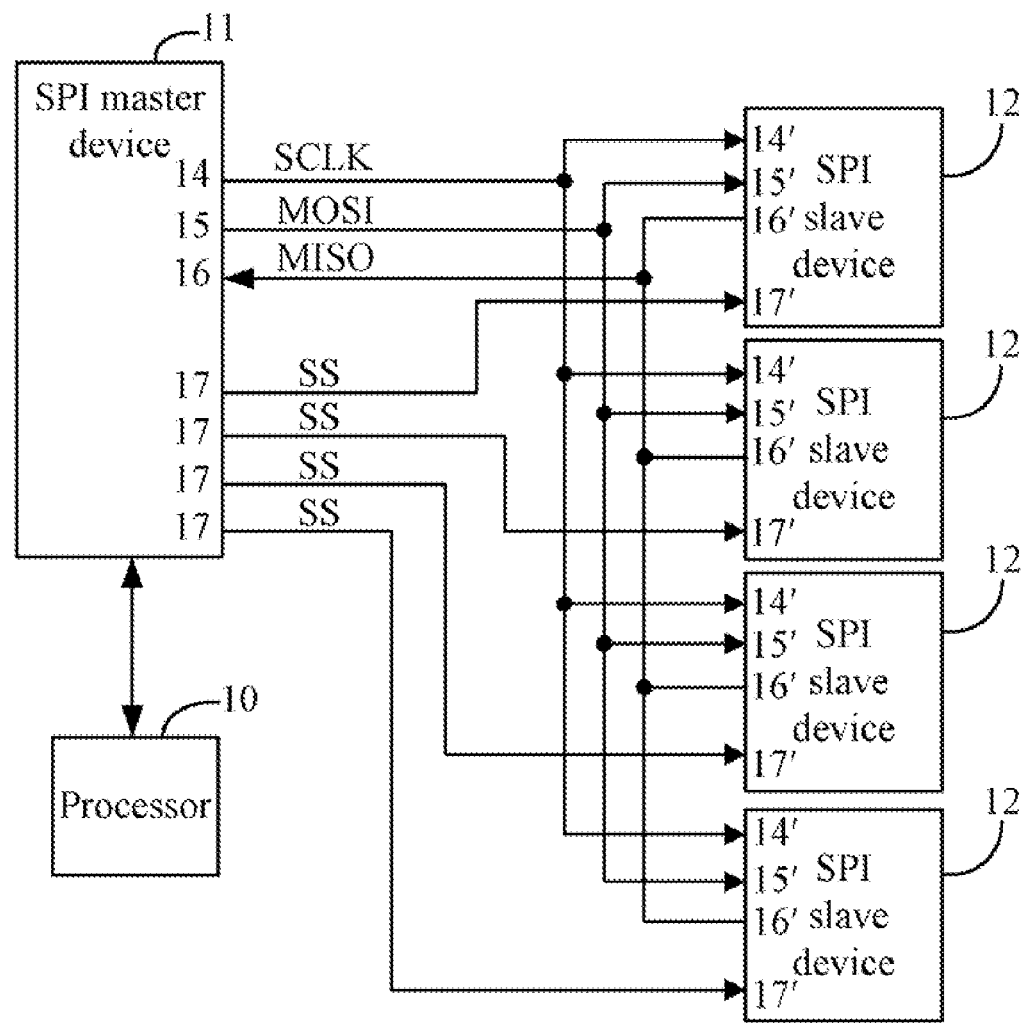
FIG. 1 is a block diagram of one embodiment of an SPI master device in communication with a plurality of SPI slave devices.

FIG. 1 is a block diagram of one embodiment of a serial peripheral interface (SPI) master device 11 in communication with a plurality of SPI slave devices 12 (four shown in FIG. 1). Each of the SPI master device 11 and the SPI slave devices 12 include a serial clock (SCLK) pin 14/14', a master output/slave input (MOSI) pin 15/15', a master input/slave output (MISO) pin 16/16', and at least one slave selection (SS) pin 17/17'. A serial clock signal is transmitted from the SPI master device 11 to the SPI slave devices 12 via the SCLK pin 14/14'. A slave selection signal for each SPI slave device 12 is transmitted via the SS pin 17/17'. According to the serial clock signal and the slave selection signal, information is transmitted from the SPI master device 11 to a selected SPI slave device 12 via the MOSI pin 15/15', or transmitted from the selected SPI slave device 12 to the SPI master device 11 via the MISO pin 16/16'. The SPI master device 11 may be connected to a processor 10, from which read/write commands are received. Detailed descriptions of a structure of the SPI master device 11 and the SPI slave devices 12 will be shown in FIG. 2 and FIG. 3.

Figure 2:
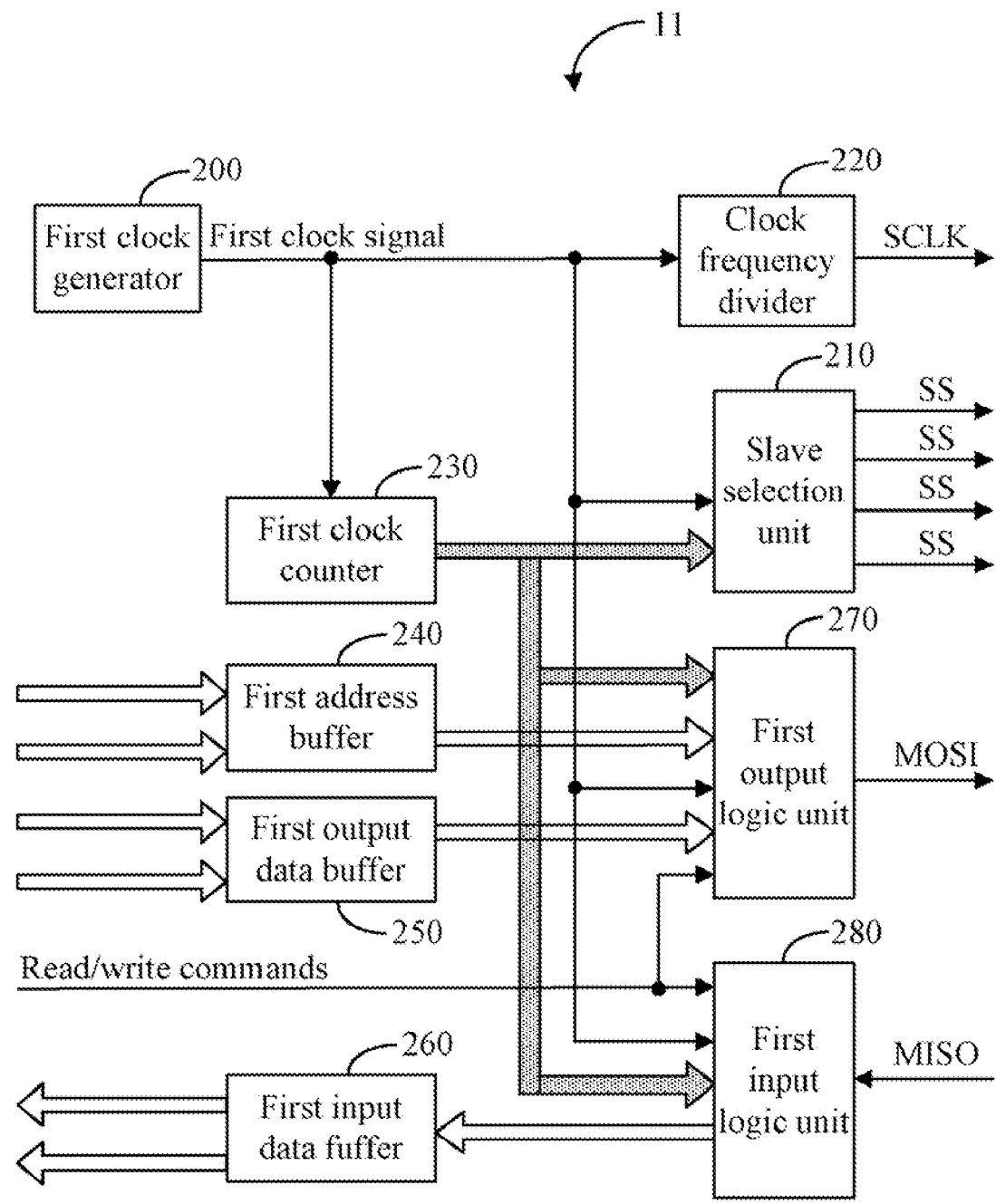
FIG. 2 is a schematic diagram of one embodiment of the SPI master device in FIG. 1.

FIG. 2 is a schematic diagram of one embodiment of the SPI master device 11 in FIG. 1. The SPI master device 11 may include a first clock generator 200, a slave selection unit 210, a clock frequency divider 220, a first clock counter 230, a first address buffer 240, a first output data buffer 250, a first input data buffer 260, a first output logic unit 270, and a first input logic unit 280. In one embodiment, the SPI master device 11 may be a field programmable gate array (FPGA), for example.

The first clock generator 200 generates a first clock signal and outputs the first clock signal to the slave selection unit 210, the clock frequency divider 220, the first clock counter 230, the first output logic unit 270, and the first input logic unit 280. The first clock signal may synchronize operations of components 210, 220, 230, 270, and 280. In one embodiment, the first clock generator 200 generates a 64 MHz clock signal as the first clock signal.

The slave selection unit 210 generates a slave selection signal for each SPI slave device 12 to determine whether the SPI slave device 12 is selected. If selected, the SPI slave device 12 is determined to be accessed.

The clock frequency divider 220 divides a clock frequency of the first clock signal by two to generate the serial clock signal, and transmits the serial clock signal to the SPI slave devices 12. For example, the clock frequency divider 220 divides a 64 MHz clock signal by two to generate a 32 MHz serial clock signal.

The first clock counter 230 counts clock cycles of the first clock signal, and outputs a count value of the first clock signal to the slave selection unit 210, the first output logic unit 270, and the first input logic unit 280. The first clock counter 230 may add one to the count value of the first clock signal every or every two clock cycles of the first clock signal, so that the SPI master device 11 can perform data transfer with the SPI slave devices 12 with a single data rate or a double data rate. Further details of the counting process may be described below.

Figure 3:
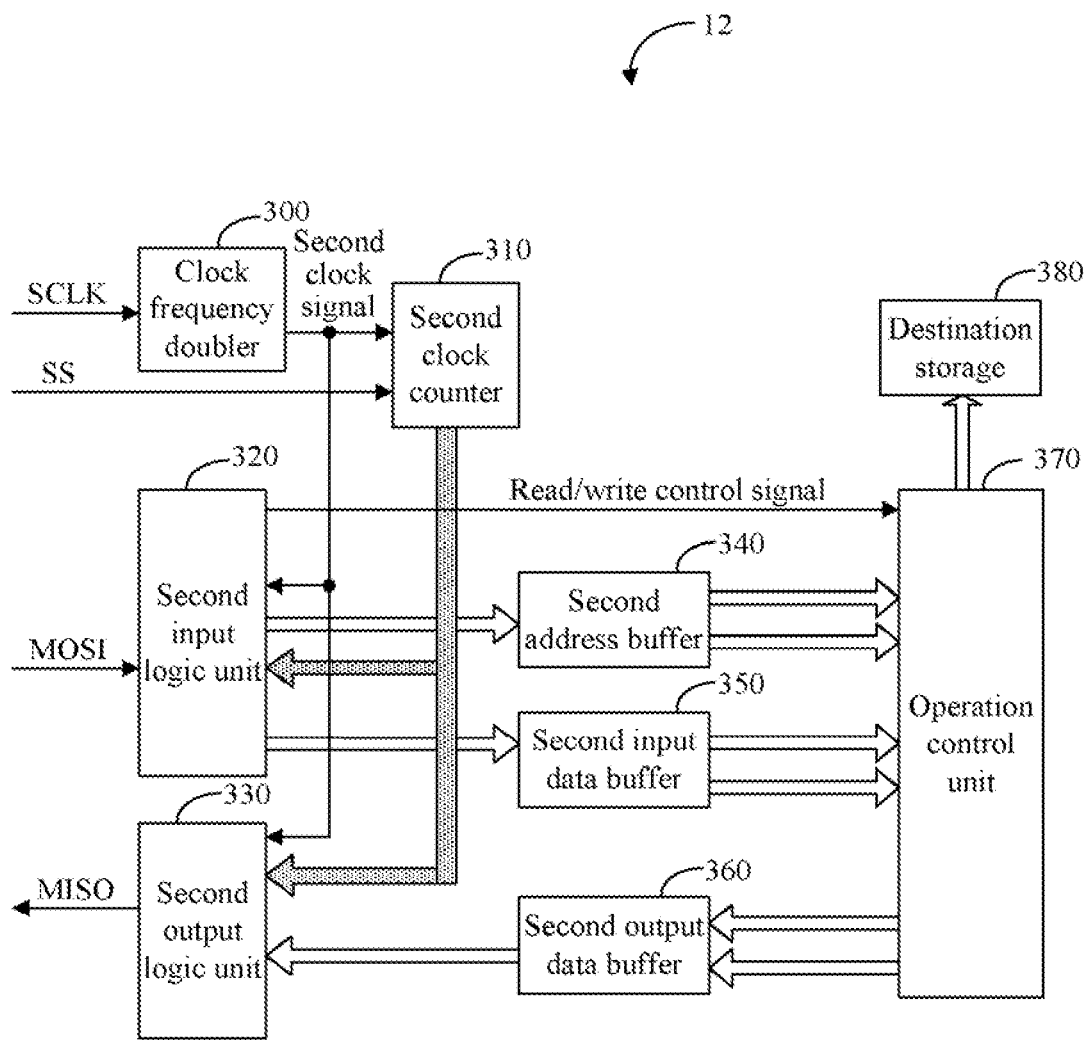
FIG. 3 is a schematic diagram of one embodiment of an SPI slave device in FIG. 1.

The first address buffer 240 stores destination addresses of a destination storage 380 (shown in FIG. 3). The first output data buffer 250 stores data to be written to the destination storage 380 of the selected SPI slave device 12. In one embodiment, the destination addresses and the data to be written may be received from the processor 10.

The first output logic unit 270 generates read/write instructions for accessing the SPI slave devices 12. In one embodiment, the first output unit 270 generates the read/write instructions according to the read/write commands received from the processor 10. The first output logic unit 270 transfers the read/write instructions, the destination addresses stored in the first address buffer 240, and the data to be written stored in the first output data buffer 250 to the selected SPI slave device 12 according to the first clock signal and the count value of the first clock signal. The first output logic unit 270 may apply a bit interleaved method to transfer the read/write instructions, the destination addresses, and the data to be written. In one embodiment, the first output logic unit 270 transfers a bit of the read/write instructions, the destination addresses, and the data to be written to the selected SPI slave device 12 on each clock edge of the first clock signal, such as a rising edge.

The first input logic unit 280 receives data read from the destination storage 380 according to the first clock signal and the clock count value of the first clock signal. The first input logic unit 280 stores the data read from the destination storage 380 into a first input data buffer 260. The data stored in the first input data buffer 260 may be transmitted to the processor 10. In one embodiment, the first input logic unit 280 may receive a bit of the read data on each clock edge of the first clock signal, such as a rising edge.

FIG. 3 is a schematic diagram of one embodiment of an SPI slave device 12 in FIG. 1. The SPI slave device 12 may include a clock frequency doubler 300, a second clock counter 310, a second input logic unit 320, a second output logic unit 330, a second address buffer 340, a second input data buffer 350, a second output data buffer 360, an operation control unit 370, and a destination storage 380. In one embodiment, the SPI slave device 12 may be a field programmable gate array (FPGA), for example.

The clock frequency doubler 300 doubles a clock frequency of the serial clock signal to generate a second clock signal, and outputs the second clock signal to the second clock counter 310, the second input logic unit 320, and the second output logic unit 330. Similar to the first clock signal, the second clock signal may synchronize operations of 310, 320, and 330. For example, the clock frequency doubler 300 doubles a 32 MHz serial clock signal to generate a 64 MHz second clock signal.

The second clock counter 310 counts clock cycles of the second clock signal, and outputs a count value of the second clock signal to the second input logic unit 320 and the second output logic unit 330. In one embodiment, the second clock counter 310 counts the clock cycles of the second clock signal if the SPI slave device 12 is selected by the SPI master device 11. Similar to the first clock counter 230, the second clock counter 310 may add 1 to the count value of the second clock signal every or every two clock cycles of the second clock signal, so that the SPI slave devices 12 may be accessed with single data rate or double data rate. Further details may be described below.

The second input logic unit 320 receives the read/write instructions, the destination addresses, and the data to be written from the SPI master device 11. The second input logic unit 320 stores the destination addresses into the second address buffer 340, stores the data to be written into the second input data buffer 350, and generates read/write control signals according to the read/write instructions. In one embodiment, the second input logic unit 320 receives a bit of the read/write instructions, destination addresses, and data to be written from the SPI master device 11 on each clock edge of the second clock signal, such as a falling edge, for example.

In response to a write control signal, the operation control unit 370 may write the data stored in the second input data buffer 350 to the destination storage 380 according to the destination addresses stored in the second address buffer 340. In response to a read control signal, the operation control unit 370 may read data from the destination storage 380 according to the destination addresses, and store the data to the second output data buffer 360.

The second output logic unit 330 transmits the data stored in the second output data buffer 360 to the SPI master device 11 according to the second clock signal and the count value of the second clock signal. The second output logic unit 330 may apply a bit interleaved method to transfer the data. In one embodiment, the second output logic unit 330 transmits a bit of the data stored in the second output data buffer 360 to the SPI master device 11 on each clock edge of the second clock signal, such as a falling edge, for example.

Figure 4:
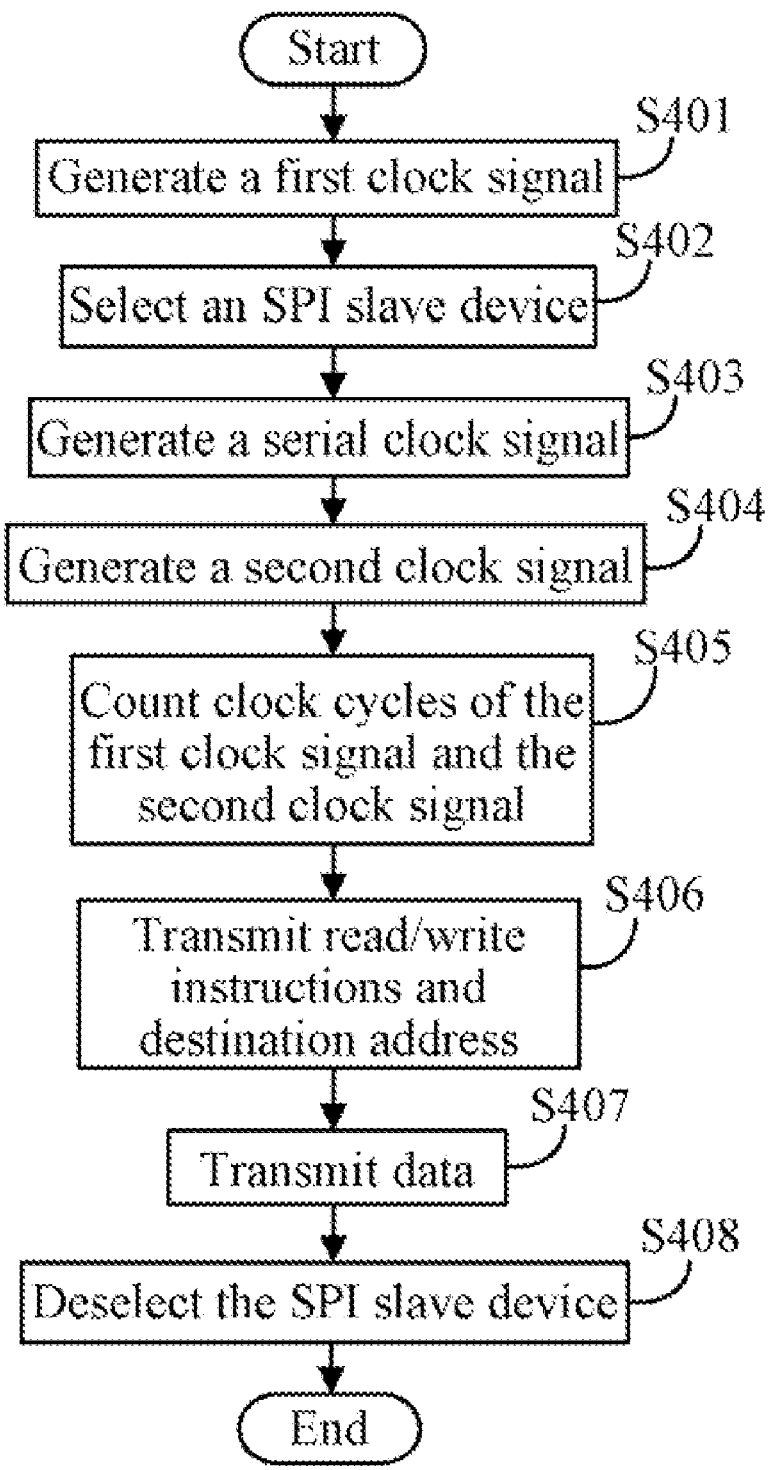
FIG. 4 is a flowchart of one embodiment of a method for transferring data between the SPI master device and the SPI slave devices in FIG. 1.

FIG. 4 is a flowchart of one embodiment of a method for transferring data between the SPI master device 11 and the SPI slave devices 12 as described in FIG. 1. Depending on the embodiments, additional blocks may be added, others removed, and the ordering of the blocks may be changed.

In block S401, the first clock generator 200 generates a first clock signal, and outputs the first clock signal to the slave selection unit 210, the clock frequency divider 220, the first clock counter 230, the first output logic unit 270, and the first input logic unit 280. In one embodiment, the first clock generator 200 generates the first clock signal according to an external clock signal, such as a 16 MHz clock signal generated by a crystal oscillator circuit. For example, the first clock generator 200 multiplies the 16 MHz clock signal by 4 to generate a 64 MHz clock signal as the first clock signal.

In block S402, the slave selection unit 210 selects one of the SPI slave devices 12. As mentioned above, the slave selection unit 210 may generate a slave selection signal for each of the SPI slave devices 12. In one embodiment, a low level slave selection signal is generated if an SPI slave device 12 is selected. Otherwise, a high level signal slave selection signal is generated if the SPI slave device 12 is not selected.

In block S403, the clock frequency divider 220 divides a clock frequency of the first clock signal by 2 to generate a serial clock signal. For example, the clock frequency divider 220 divides a 64 MHz clock signal by two to generate a 32 MHz serial clock signal. As mentioned above, the serial clock signal is transmitted to the SPI slave devices 12.

In block S404, the clock frequency doubler 300 doubles the serial clock signal to generate a second clock signal. In one embodiment, the clock frequency doubler 300 doubles the serial clock signal applying a phase lock loop circuit.

In block S405, the first clock counter 230 counts clock cycles of the first clock signal, and outputs a count value of the first clock signal to the slave selection unit 210, the first input logic unit 270, and the first input logic unit 280. The second clock counter 310 counts clock cycles of the second clock signal according to the slave selection signal, and outputs a count value of the second clock signal to the second input logic unit 320 and the second output logic unit 330.

In one embodiment of data transfer with a single data rate, the first clock counter 230 may add one to the count value of the first clock signal every two clock cycles of the first clock signal. Likewise, the second clock counter 310 may add one to the count value of the second clock signal every two clock cycles of the second clock signal. In another embodiment of data transfer with a double data rate, the first clock counter 230 may add one to the count value of the first clock signal every clock cycle of the first clock signal. Likewise, the second clock counter 310 may add one to the count value of the second clock signal every clock cycle of the second clock signal.

In block S406, the first output logic unit 270 generates read/write instructions, and transfers the read/write instructions and destination addresses to the SPI slave device 12 according to the first clock signal and the count value of the first clock signal. The second input logic unit 320 receives the read/write instructions and the destination addresses from the SPI master device 11, and generates read/write control signals according to the read/write instructions. The first output logic unit 270 may receive the destination addresses from the processor 10 and store the destination addresses in the first address buffer 240 before transferring the destination addresses. The second input logic unit 320 may store the destination addresses into the second address buffer 340 after receiving the destination addresses. In one embodiment, the first output logic unit 270 transfers a bit of the read/write instructions and the destination addresses to the selected SPI slave device 12 on each clock edge of the first clock signal, such as a rising edge, for example. Accordingly, the second input logic unit 320 may receive a bit of the read/write instructions and the destination addresses from the SPI master device 11 on each clock edge of the second clock signal, such as a falling edge, for example.

In block S407, corresponding to a write instruction, the first output logic unit 270 transfers data to be written to the SPI slave device 12 according to the first clock signal and the count value of the first clock signal. The second input logic unit 320 receives the data to be written from the SPI master device 11. The operation control unit 370 writes the data to be written to the destination storage 380 according to the destination addresses. The first output logic unit 270 may store the data to be written into the first output data buffer 250 before transferring the data to be written. The second input logic unit 320 may store the data to be written into the second input data buffer 350 after receiving the data to be written. In one embodiment, the first output logic unit 270 may transfer a bit of the data to be written to the SPI slave device 12 on each clock edge of the first clock signal, such as a rising edge, for example. Accordingly, the second input logic unit 320 may receive a bit of the data to be written on each clock edge of the second clock signal, such as a falling edge, for example.

Corresponding to a read instruction, the operation control unit 370 reads data from the destination storage 380 according to the destination addresses. The second output logic unit 330 transmits the data read from the destination storage 380 to the SPI master device 11 according to the second clock signal and the count value of the second clock signal. The first input logic unit 280 receives the data read from the destination storage 380 according to the first clock signal and the clock count value of the first clock signal. The data read from the destination storage 380 may be output to the processor 10. The operation control unit 370 may store the data read from the destination storage 380 into the second output data buffer 360. The first input logic unit 280 may store the data read from the destination storage 380 into the first input data buffer 260. In one embodiment, the second output logic unit 330 transmits a bit of the data read from the destination storage 380 on each clock edge of the second clock signal, such as a falling edge. Accordingly, the first input logic unit 280 may receive a bit of the data read from the destination storage 380 on each clock edge of the first clock signal, such as a rising edge.

In block S408, the slave selection unit 210 deselects the SPI slave device 12 after finishing the data transfer between the SPI master device 11 and the SPI slave device 12. The slave selection unit 210 may determine when to deselect the SPI slave device 12 according to the count value of the first clock signal. For example, if the count value of the first clock signal equals to a predetermined value, such as 32, the slave selection unit 210 deselects the SPI slave device 12. As such, data transfer between the SPI master device 11 and the SPI slave device is terminated.

FIGS. 5-8 illustrates embodiments of data transfer between the SPI master device 11 and the SPI slave devices 12 with a double data rate. Information transferred between the SPI master device 11 and the SPI slave device 12 includes read/write instructions, addresses, data to be written to the destination storage 380, and/or data read from the destination storage 380. The serial clock signal is denoted as SCLK, information transferred from the SPI master device 11 to the SPI slave devices 12 is denoted as MOSI, and information transferred from SPI slave devices 12 to the SPI master device 11 is denoted as MISO. In waveforms of MOSI and MISO, /W0 and /W1 denote read instructions, R0 and R1 denote write instructions, A00-A06 denote a first 7-bit destination address, A10-A16 denote a second 7-bit destination address, D00-D07 denote a first 8-bit data, D10-D17 denote a second 8-bit data.

Figure 5:
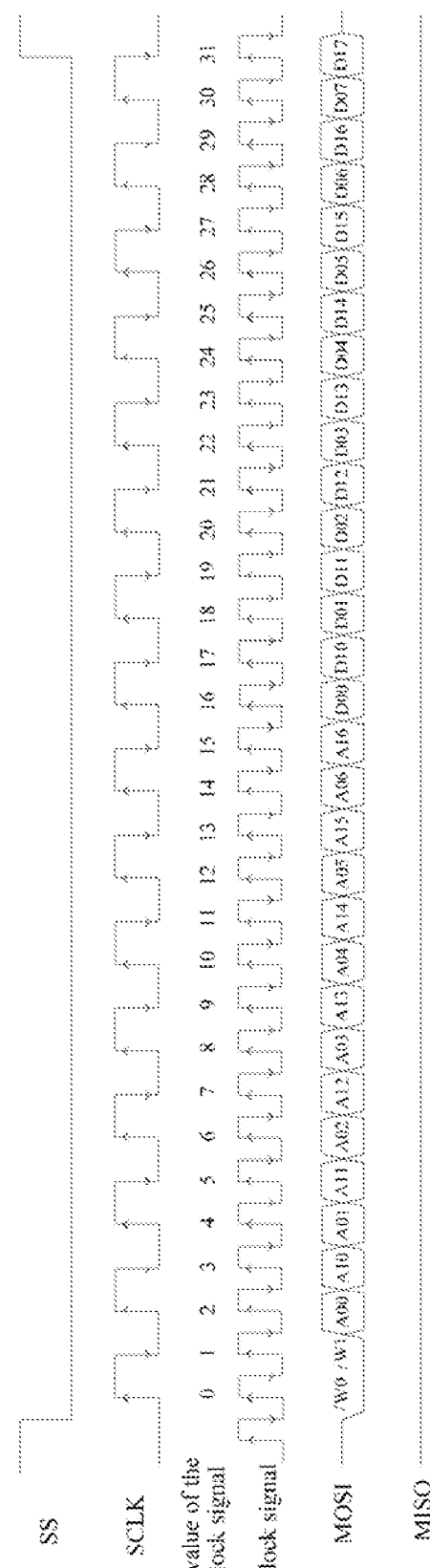
FIG. 5 illustrates one embodiment of dual write operations with a double data rate.
Figure 6:
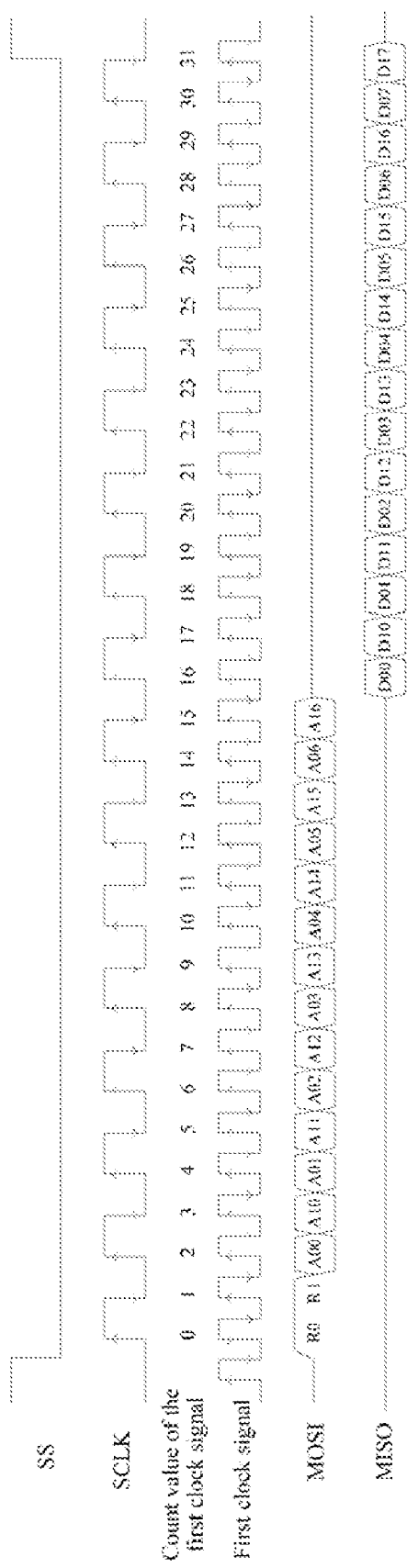
FIG. 6 illustrates one embodiment of dual read operations with a double data rate.
Figure 7:
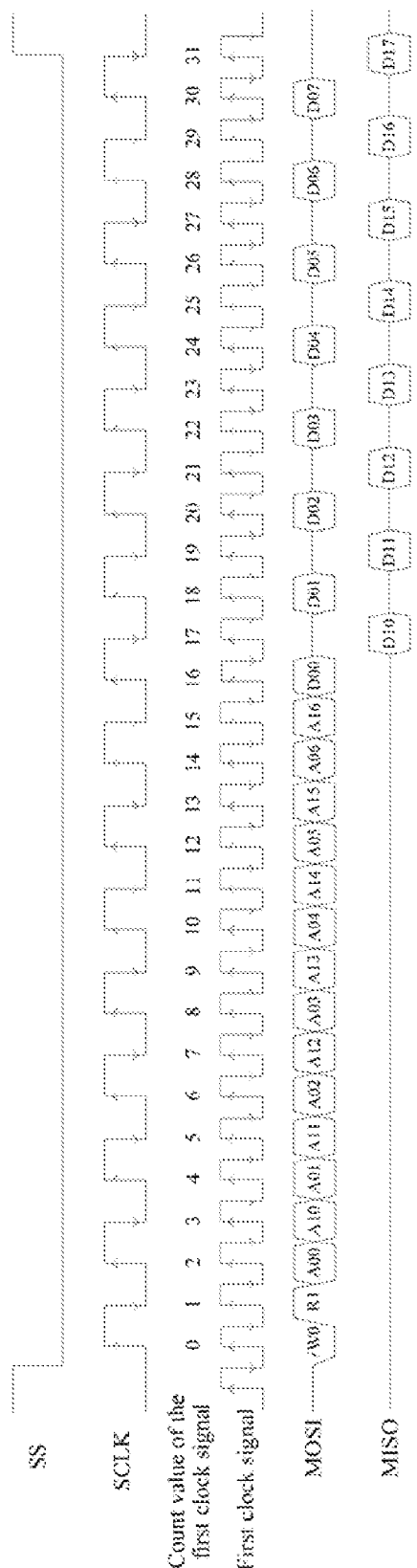
FIG. 7 illustrates one embodiment of a read operation and a write operation with a double data rate.
Figure 8:
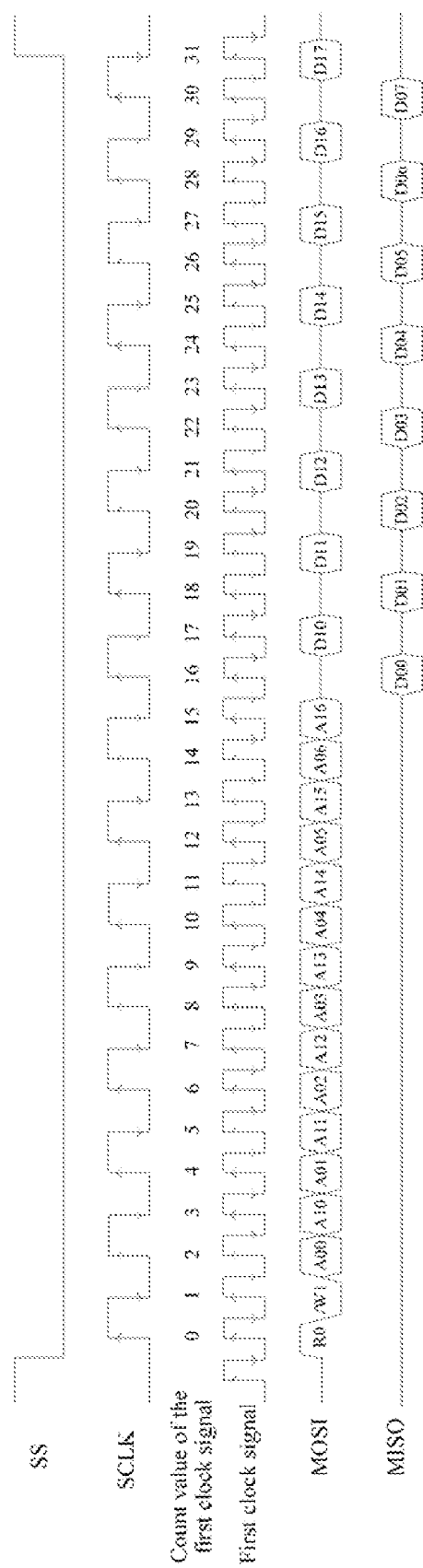
FIG. 8 illustrates one embodiment of a write operation and a read operation with a double data rate.

In particular, FIG. 5 illustrates one embodiment of dual write operations with a double data rate. FIG. 6 illustrates one embodiment of dual read operations. FIG. 7 illustrates one embodiment of a read operation and a write operation. FIG. 8 illustrates one embodiment of a write operation and a read operation.

Figure 9:
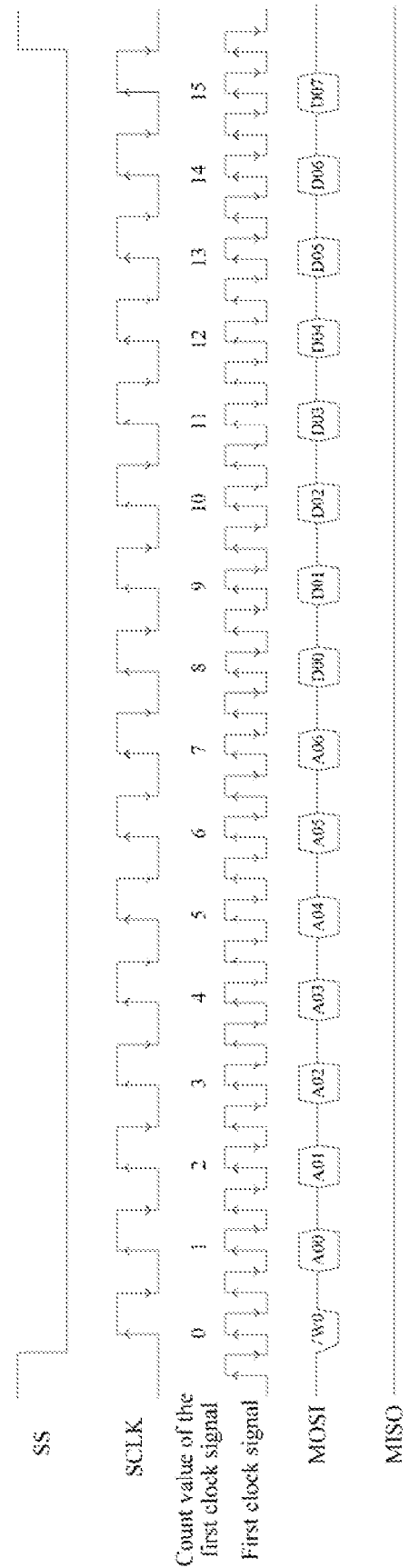
FIG. 9 illustrates one embodiment of a write operation with a single data rate.
Figure 10:
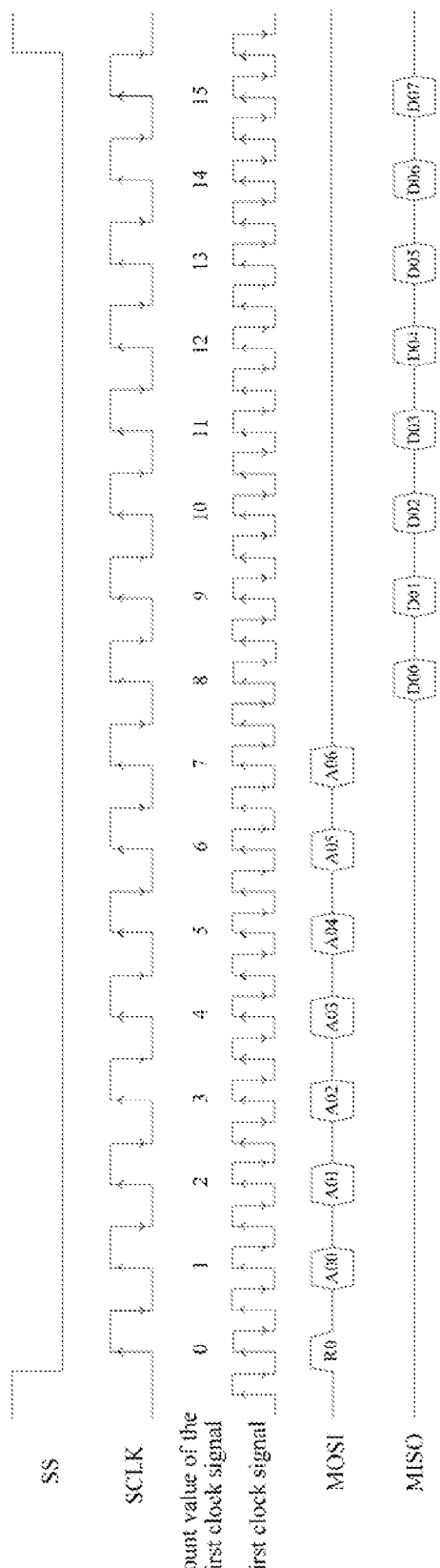
FIG. 10 illustrates one embodiment of a read operation with a single data rate.

FIGS. 9-10 illustrates embodiments of data transfer between the SPI master device 11 and the SPI slave devices 12 with a single data rate. In particular, FIG. 9 illustrates one embodiment of a write operation. FIG. 10 illustrates one embodiment of a read operation.

Although certain inventive embodiments of the present disclosure have been specifically described, the present disclosure is not to be construed as being limited thereto. Various changes or modifications may be made to the present disclosure without departing from the scope and spirit of the present disclosure.

What is claimed is:

1. A serial peripheral interface (SPI) master device, the SPI master device in communication with at least one SPI slave device, the SPI master device comprising:
   a first clock generator operable to generate a first clock signal;
   a slave selection unit operable to generate a slave selection signal for each of the at least one SPI slave device to determine whether each of the at least one SPI slave device is selected;
   a clock frequency divider operable to divide a clock frequency of the first clock signal by two to generate a serial clock signal for the at least one SPI slave device;
   a first clock counter operable to count clock cycles of the first clock signal;
   a first output logic unit operable to generate one or more read/write instructions, and transfer the one or more read/write instructions, one or more destination addresses and data to be written to the selected SPI slave device according to the first clock signal and a count value of the first clock signal; and
   a first input logic unit operable to receive data from the selected SPI slave device according to the first clock signal and the count value of the first clock signal.

2. The SPI master device of claim 1, further comprising:
   a first address buffer operable to store the one or more destination addresses;
   a first output data buffer operable to store the data to be written; and
   a first input data buffer operable to store the data received from the selected SPI slave device.

3. The SPI master device of claim 1, wherein the first clock counter adds one to the count value of the first clock signal every or every two clock cycles of the first clock signal.

4. The SPI master device of claim 1, wherein the first output logic unit applies a bit interleaved method to transfer the one or more read/write instructions, the one or more destination addresses, and the data to be written.

5. The SPI master device of claim 1, wherein the slave selection unit determines when to deselect the SPI slave device according to the count value of the first clock signal.

6. A serial peripheral interface (SPI) slave device, the SPI slave device in communication with an SPI master device, the SPI slave device comprising:
   a clock frequency doubler operable to double a clock frequency of a serial clock signal received from the SPI master device to generate a second clock signal;
   a second clock counter operable to count clock cycles of the second clock signal;
   a second input logic unit operable to receive one or more read/write instructions, one or more destination addresses, and data to be written from the SPI master device according to the second clock signal and a count value of the second clock signal, and generate one or more read/write control signals according to the one or more read/write instructions;

an operation control unit operable to write the data to be written to a destination storage of the SPI slave device according to the one or more destination addresses in response to a read control signal, or read data from the destination storage according to the one or more destination addresses in response to a read control signal; and a second output logic unit operable to transfer the data read from the destination storage to the SPI master device according to the second clock signal and the count value of the second clock signal.

7. The SPI slave device of claim 6, further comprising:
a second address buffer operable to store the one or more destination addresses received from the SPI master device;
a second input data buffer operable to store the data to be written received from the SPI master device; and
a second output data buffer operable to store the data read from the destination storage.

8. The SPI slave device of claim 6, wherein the second clock counter adds one to the count value of the second clock signal every or every two clock cycles of the second clock signal.

9. The SPI slave device of claim 6, wherein the second output logic unit applies a bit interleaved method to transfer the data read from the destination storage.

10. The SPI slave device of claim 6, wherein the second clock counter counts the clock cycles of the second clock signal upon a condition that the SPI slave device is selected by the SPI master device.

11. The SPI slave device of claim 6, wherein the clock frequency doubler doubles the serial clock signal applying a phase lock loop circuit.

12. A method for transferring data between a serial peripheral interface (SPI) master device and at least one SPI slave device, comprising:
generating a first clock signal for the SPI master device;
selecting one of the at least one SPI slave device;
dividing a clock frequency of the first clock signal by two to generate a serial clock signal, and transmitting the serial clock signal to the selected SPI slave device;
doubling the serial clock signal to generate a second clock signal;
counting clock cycles of the first clock signal, and counting clock cycles of the second clock signal;
generating one or more read/write instructions and transferring the one or more read/write instructions and one or more destination addresses to the selected SPI slave device according to the first clock signal and a count value of the first clock signal;
if the generated instructions are write instructions, transferring data to be written to the selected SPI slave device according to the first clock signal and the count value of the first clock signal, and writing the transferred data to a destination storage of the selected SPI slave device according to the one or more destination addresses; or if the generated instructions are read instructions, reading data from the destination storage of the selected SPI salve device according to the one or more destination addresses, and transferring the read data to the SPI master device according to the second clock signal and a count value of the second clock signal; and
deselecting the SPI slave device.

13. The method of claim 12, wherein the SPI master device adds one to the count value of the first clock signal every or every two clock cycles of the first clock signal, and the SPI slave device adds one to the count value of the second clock signal every or every two clock cycles of the second clock signal.

14. The method of claim 12, wherein the one or more read/write instructions, the one or more destination addresses, the data to be written, and the data read from the destination storage are transferred applying a bit interleaved method.

15. The method of claim 12, wherein the SPI slave device is deselected according to the count value of the first clock signal.

16. The method of claim 12, wherein the SPI slave device doubles the serial clock signal applying a phase lock loop circuit.

* * * * *